(12) United States Patent
Kim et al.

(10) Patent No.: US 12,087,928 B2
(45) Date of Patent: Sep. 10, 2024

(54) BATTERY MODULE AND BATTERY PACK INCLUDING THE SAME

(71) Applicant: LG Energy Solution, Ltd., Seoul (KR)

(72) Inventors: Soo Youl Kim, Daejeon (KR); Junkyu Park, Daejeon (KR); Han Ki Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 572 days.

(21) Appl. No.: 17/416,050

(22) PCT Filed: May 13, 2020

(86) PCT No.: PCT/KR2020/006274
§ 371 (c)(1),
(2) Date: Jun. 18, 2021

(87) PCT Pub. No.: WO2020/251176
PCT Pub. Date: Dec. 17, 2020

(65) Prior Publication Data
US 2022/0052391 A1     Feb. 17, 2022

(30) Foreign Application Priority Data
Jun. 12, 2019   (KR) ........................ 10-2019-0069232

(51) Int. Cl.
*H01M 10/653*     (2014.01)
*H01M 50/211*     (2021.01)
*H01M 50/249*     (2021.01)

(52) U.S. Cl.
CPC ....... *H01M 10/653* (2015.04); *H01M 50/211* (2021.01); *H01M 50/249* (2021.01); *H01M 2220/20* (2013.01)

(58) Field of Classification Search
CPC .......................... H01M 50/211; H01M 10/653
See application file for complete search history.

(56) References Cited

U.S. PATENT DOCUMENTS 9,153,799 B2    10/2015   Kim et al.
9,306,194 B2     4/2016   Kim et al.
(Continued)

FOREIGN PATENT DOCUMENTS

CN       106025423 A    10/2016
CN       109643768 A     4/2019
(Continued)

OTHER PUBLICATIONS

Search Report dated Dec. 28, 2022 from the Office Action for Chinese Application No. 202080032568.5 issued Jan. 5, 2023, pp. 1-3. [See p. 2, categorizing the cited references].
(Continued)

*Primary Examiner* — Jonathan G Jelsma
(74) *Attorney, Agent, or Firm* — Lerner David LLP (57) ABSTRACT

A battery module according to an embodiment of the present disclosure comprises: a battery cell stack in which a plurality of battery cells are stacked; a U-shaped frame accommodating the battery cell stack and having an open upper portion; and an upper plate covering the battery cell stack at the open upper portion of the U-shaped frame. A surface of the battery cell stack extending parallel to a stacking direction of the plurality of battery cells is mounted on a bottom portion of the U-shaped frame. A stepped portion is formed on one side of the bottom portion of the U-shaped frame, and at least one of the battery cells includes a protruding portion protruding toward the stepped portion. The stepped portion may be formed by a bent portion of the bottom portion of the U-shaped frame.

18 Claims, 9 Drawing Sheets

(56) References Cited

U.S. PATENT DOCUMENTS

| | | |
|---|---|---|
| 9,865,845 B2 | 1/2018 | Kim et al. |
| 9,882,178 B2 | 1/2018 | Kim et al. |
| 10,103,368 B2 | 10/2018 | Gunna et al. |
| 10,141,546 B2 | 11/2018 | Kim et al. |
| 2014/0295235 A1 | 10/2014 | Jung |
| 2015/0064540 A1 | 3/2015 | Roh et al. |
| 2017/0025719 A1 | 1/2017 | Yamada et al. |
| 2017/0176108 A1* | 6/2017 | Palanchon ........ H01M 10/6567 |
| 2017/0190264 A1 | 7/2017 | Kim et al. |
| 2018/0019508 A1 | 1/2018 | Lee et al. |
| 2018/0269435 A1 | 9/2018 | Lee et al. |
| 2018/0358665 A1 | 12/2018 | Kim et al. |
| 2019/0131596 A1 | 5/2019 | Yang et al. |
| 2021/0028423 A1 | 1/2021 | Shin et al. |
| 2021/0226291 A1 | 7/2021 | Kim et al. |
| 2022/0158272 A1 | 5/2022 | Ju et al. |

FOREIGN PATENT DOCUMENTS

| | | |
|---|---|---|
| EP | 3694017 A1 | 8/2020 |
| EP | 3923369 A1 | 12/2021 |
| EP | 3958380 A1 | 2/2022 |
| JP | 2003249205 A | 9/2003 |
| JP | 4947893 B2 | 6/2012 |
| JP | 2018502431 A | 1/2018 |
| JP | 2019508870 A | 3/2019 |
| KR | 20140118734 A | 10/2014 |
| KR | 101503983 B1 | 3/2015 |
| KR | 101520902 B1 | 5/2015 |
| KR | 20160087141 A | 7/2016 |
| KR | 20170082041 A | 7/2017 |
| KR | 20190078521 A * | 7/2019 |
| WO | 2013183945 A1 | 12/2013 |
| WO | 2017188605 A1 | 11/2017 |
| WO | 2019088625 A1 | 5/2019 |
| WO | 2021221284 A1 | 11/2021 |

OTHER PUBLICATIONS

International Search Report for Application No. PCT/KR2020/006274 mailed Sep. 1, 2020, pp. 1-3.

Extended European Search Report and European Search Opinion for Application No. EP20822563.1 dated Feb. 18, 2022, 8 pgs.

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/006274 filed May 13, 2020, which claims priority from Korean Patent Application No. 10-2019-0069232 filed on Jun. 12, 2019, the disclosures of which are incorporated herein by reference in their entirety.

TECHNICAL FIELD

The present disclosure relates to a battery module and a battery pack including the same, and more particularly, to a battery module which improves space utilization rate and minimizes the use of a thermally conductive resin, and a battery pack including the same.

BACKGROUND ART

Secondary batteries, which are easily applied to various product groups and have electrical characteristics such as high energy density, are universally applied not only for a portable device but also for an electric vehicle or a hybrid electric vehicle, an energy storage system or the like, which is driven by an electric driving source. Such secondary batteries are attracting attention as a new environmentally-friendly energy source for improving energy efficiency since they provide a primary advantage of remarkably reducing the use of fossil fuels and also do not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Preferably, the middle- or large-sized battery module is manufactured so as to have as small a size and weight as possible. Consequently, a prismatic battery or a pouch-shaped battery, which can be stacked with high integration and has a small weight to capacity ratio, is usually used as a battery cell of the middle- or large-sized battery module. Meanwhile, in order to protect the cell stack from external shock, heat, or vibration, the battery module may include a frame member whose front and back surfaces are opened so as to accommodate the battery cell stack in an internal space.

Figure 1:
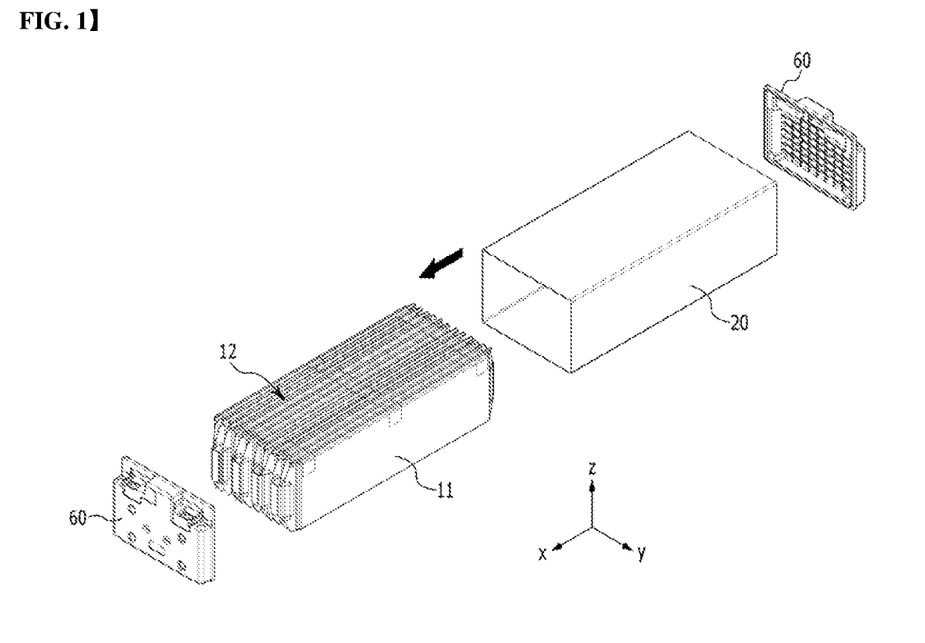
FIG. 1 is an exploded perspective view showing a battery module having a conventional mono frame.

FIG. 1 is an exploded perspective view showing a battery module having a conventional mono frame.

Referring to FIG. 1, the battery module may include a battery cell stack 12 formed by stacking a plurality of battery cells 11, a mono frame 20 with opened front and rear surfaces to cover the battery cell stack 12, and an end plate 60 covering the front and rear surfaces of the mono frame 20. In order to form such a battery module, horizontal assembly is required so that the battery cell stack 12 is inserted into the opened front or rear surface of the mono frame 20 along an X-axis direction as in an arrow shown in FIG. 1. However, sufficient clearance must be secured between the battery cell stack 12 and the mono frame 20 so that such horizontal assembly can be stably performed. Here, the clearance means a gap generated by fitting or the like.

A thermally conductive resin layer (not shown) may be formed between the battery cell stack 12 and the mono frame 20. The thermally conductive resin layer may serve to transfer heat generated from the battery cell stack to the outside of the battery module and to fix the battery cell stack in the battery module. If the clearance becomes large, the use of the thermally conductive resin layer may be increased more than necessary.

In addition, a height of the mono frame 20 should be designed to be large in consideration of the maximum height of the battery cell stack 12 and an assembly tolerance during an insertion process, and thus, unnecessary wasted space may occur.

DETAILED DESCRIPTION OF THE INVENTION

Technical Problem

It is an object of the present disclosure to provide a battery module which improves space utilization rate and minimizes the use of a thermally conductive resin by modifying a structure of a frame member surrounding a battery cell stack, and a battery pack including the same.

However, technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

A battery module according to one embodiment of the present disclosure comprises: a battery cell stack in which a plurality of battery cells are stacked, a U-shaped frame accommodating the battery cell stack and having an opened upper portion, and an upper plate covering the battery cell stack at the opened upper portion of the U-shaped frame, wherein a surface of the battery cell stack parallel to a stacking direction of the plurality of battery cells is mounted on a bottom portion of the U-shaped frame; a stepped portion is formed on one side of the bottom portion of the U-shaped frame; the battery cell includes a protruding portion protruding toward the stepped portion; and the stepped portion is formed by a bending portion of the bottom portion of the U-shaped frame.

The bottom portion of the U-shaped frame member includes a first portion and a second portion, wherein the first portion is located at an edge based on a longitudinal direction of the battery cell; the second portion is located inside the first portion; the first portion may correspond to the stepped portion; and the thickness of the bottom portion of the U-shaped frame before and after the bending portion for forming the stepped portion may be the same.

The battery module may further include a thermally conductive resin layer positioned between the bottom portion of the U-shaped frame and the battery cell stack in the second portion.

The battery module may further include an insulating sheet positioned between the stepped portion and the protruding portion of the battery cell.

The insulating sheet may be formed of polyethylene terephthalate (PET).

The battery module further includes an end plate coupled to each of opened both sides of the U-shaped frame, wherein opened both sides of the U-shaped frame may face each other based on a protruding direction of an electrode lead of the battery cell stack.

The U-shaped frame includes a bottom portion, and two side surface portions facing each other while being connected by the bottom portion, and a distance between the two side surface portions may be identical to a width of the upper plate.

The protruding portion may be formed in a width direction of the battery cell.

The battery cell includes three sealing parts and one connecting portion among the four borders, and the protruding portion of the battery cell may protrude from the connecting portion.

A battery pack according to another embodiment of the present disclosure includes the battery module as described above.

Advantageous Effects

According to the embodiments, by implementing a U-shaped frame, a tolerance between the battery cell stack and the frame is reduced compared to the prior art, thereby improving space utilization rate.

In addition, by press-molding an edge of the bottom portion of the U-shaped frame, a gap between the battery cell stack and the frame can be reduced, thereby improving space utilization rate in a height direction and minimizing the applied amount of a thermally conductive resin.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element is arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 2:
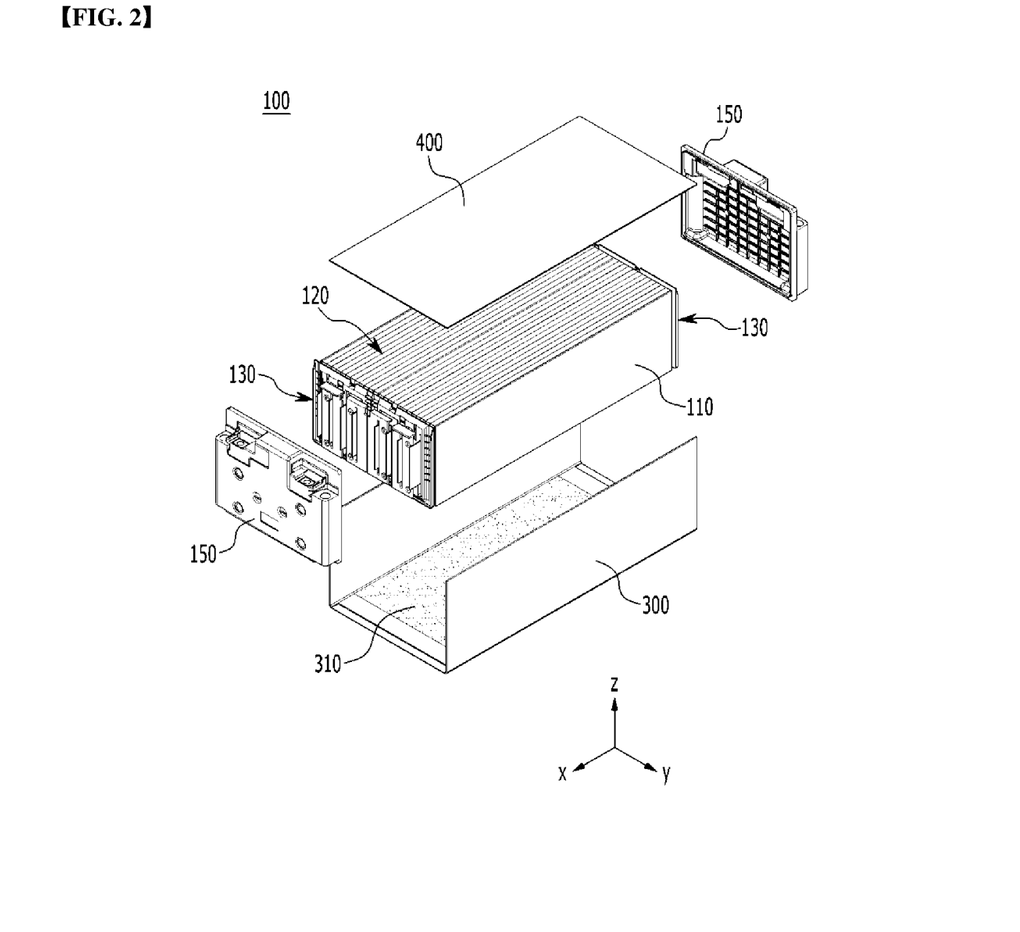
FIG. 2 is an exploded perspective view showing a battery module according to one embodiment of the present disclosure.
Figure 3:
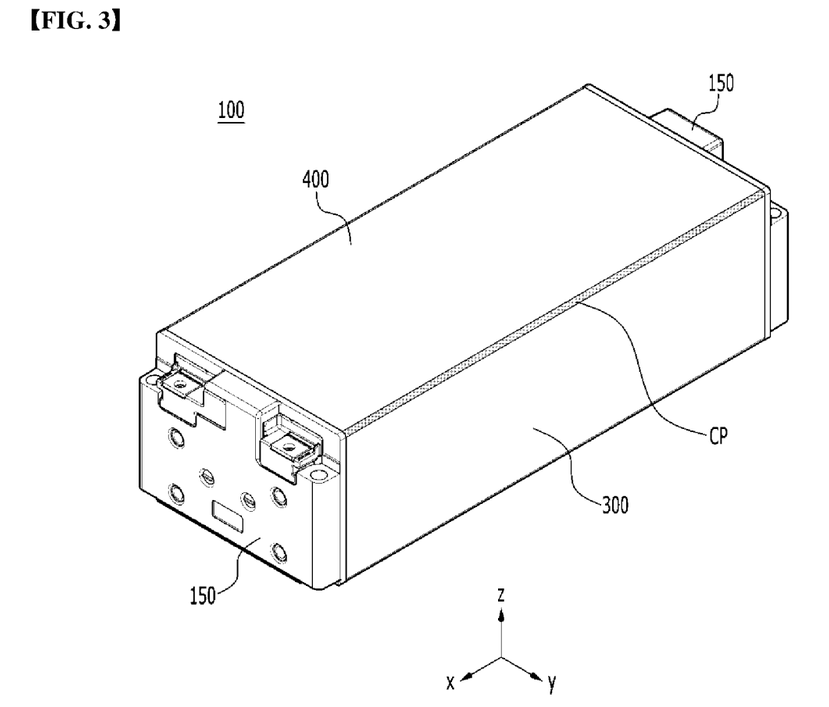
FIG. 3 is a perspective view showing a state in which the components constituting the battery module of FIG. 2 are coupled.
Figure 4:
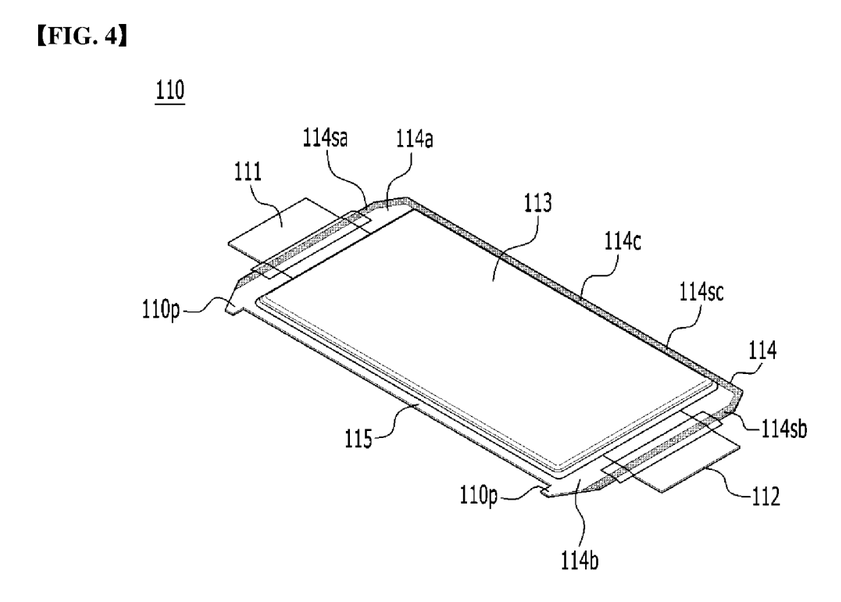
FIG. 4 is a perspective view showing a pouch-type battery according to one embodiment of the present disclosure.

FIG. 2 is an exploded perspective view showing a battery module according to one embodiment of the present disclosure. FIG. 3 is a perspective view showing a state in which the components constituting the battery module of FIG. 2 are coupled. FIG. 4 is a perspective view showing a pouch-type battery according to one embodiment of the present disclosure.

Referring to FIGS. 2 and 3, a battery module 100 according to the present embodiment includes: a battery cell stack 120 including a plurality of battery cells 110, a U-shaped frame 300 with opened upper, front and rear surfaces, an upper plate 400 covering an upper portion of the battery cell stack 120, an end plate 150 positioned on each of the front and rear surfaces of the battery cell stack 120, and a busbar frame 130 positioned between the battery cell stack 120 the end plates 150.

When opened both sides of the U-shaped frame 300 are referred to as a first side and a second side, respectively, the U-shaped frame 300 has a plate-shaped structure bent so as to continuously surround the front, lower and rear surfaces adjacent to each other among the remaining outer surfaces except for surfaces of the battery cell stack 120 corresponding to the first side and the second side. The upper surface corresponding and opposite to the lower surface of the U-shaped frame 300 is open.

The upper plate 400 has a single plate-shaped structure surrounding the upper surface of the remainder excluding the front, lower and rear surfaces which are surrounded by the U-shaped frame 300. The U-shaped frame 300 and the upper plate 400 may be coupled by welding or the like in a state in which the corresponding corner areas are in contact with each other, thereby forming a structure surrounding the battery cell stack 120. That is, the U-shaped frame 300 and the upper plate 400 may have a coupling portion CP formed along edges corresponding to each other by a coupling method such as welding.

The battery cell stack 120 includes a plurality of battery cells 110 stacked in one direction, and the plurality of battery cells 110 may be stacked in a Y-axis direction as shown in FIG. 2. The battery cell 110 is preferably a pouch-type battery cell. For example, referring to FIG. 4, the battery cell 110 according to the present embodiment has a structure in which two electrode leads 111 and 112 are opposite to each other and protrude from one end 114a and the other end 114b of the battery body 113, respectively. The battery cell 110 can be manufactured by bonding both ends 114a and 114b of the battery case 114 and a side surface portion 114c connecting them in a state in which the electrode assembly (not shown) is accommodated in the battery case 114. In other words, the battery cell 110 according to the present embodiment has a total of three sealing portions 114sa, 114sb, and 114sc, and the sealing portions 114sa, 114sb, 114sc are sealed by a method such as thermal fusion, and the other side surface portion may be formed of a connecting portion 115. A direction between both ends 114a and 114b of the battery case 114 may be defined as a longitudinal direction of the battery cell 110, and a direction between the one side surface portion 114c and the connecting portion 115 connecting the both ends 114a and 114b of the battery case 114 may be defined as a width direction of the battery cell 110.

The connecting portion 115 is an area extending along one long border of the battery cell 110, and a protruding portion 110p of the battery cell 110 may be formed at an end of the connecting portion 115. The protruding portion 110p may be formed at at least one of both ends of the connecting portion 115 and may protrude in a direction perpendicular to a direction in which the connecting portion 115 extends. The protruding portion 110p may be positioned between one of the sealing portions 114sa and 114sb of each end 114a and 114b of the battery case 114 and the connecting portion 115.

The battery case 114 is generally made of a laminate structure of a resin layer/metal thin film layer/resin layer. For example, in the case where a surface of the battery case is made of an O(oriented)-nylon layer, when a plurality of battery cells are stacked to form a medium or large-sized battery module, they tend to slide easily due to external impact. Therefore, in order to prevent this and maintain a stable stacked structure of battery cells, the battery cell stack 120 may be formed by attaching an adhesive member, such as a pressure sensitive adhesive such as a double-sided tape, or a chemical adhesive bonded by a chemical reaction upon bonding, to the surface of the battery case. In the present embodiment, the battery cell stack 120 may be stacked in a Y-axis direction, accommodated in the U-shaped frame 300 in a Z-axis direction, and cooled by a thermally conductive resin layer to be described later. As a comparative example, there is a case in which the battery cells are formed of a cartridge-type part and the fixing between the battery cells is made by assembling the battery module frame. In this comparative example, due to the presence of the cartridge-type part, the cooling action hardly proceeds or may proceed in a surface direction of the battery cell, and cooling is not well performed in a height direction of the battery module.

Figure 5:
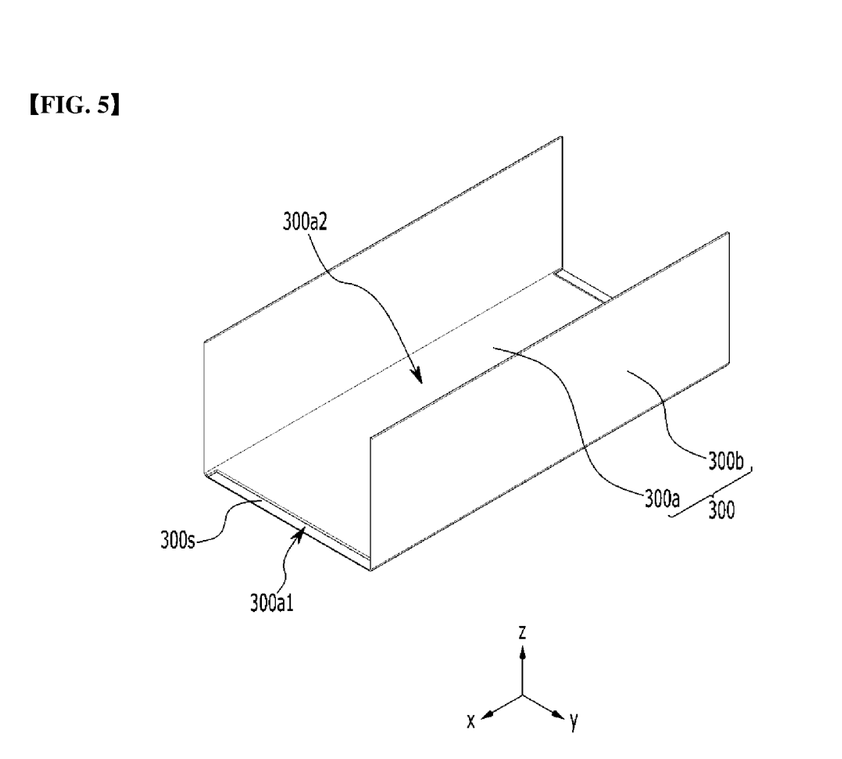
FIG. 5 is a perspective view showing a U-shaped frame in the battery module of FIG. 2.
Figure 6:
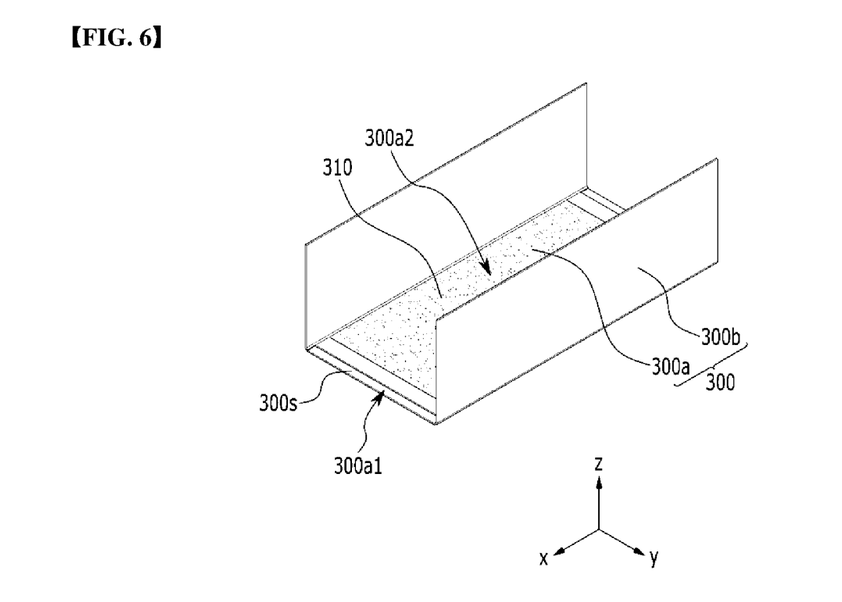
FIG. 6 is a perspective view showing a thermally conductive resin layer formed on a bottom portion of the U-shaped frame in FIG. 5.

FIG. 5 is a perspective view showing a U-shaped frame in the battery module of FIG. 2. FIG. 6 is a perspective view showing a thermally conductive resin layer formed on a bottom portion of the U-shaped frame in FIG. 5.

Referring to FIG. 5, the U-shaped frame 300 according to the present embodiment includes a bottom portion 300a and two side surface portions 300b facing each other. Before the battery cell stack 120 described in FIG. 2 is mounted on the bottom portion 300a of the U-shaped frame 300, a thermally conductive resin may be applied to the bottom portion 300a of the U-shaped frame 300 and cured to form the thermally conductive resin layer 310 shown in FIG. 6.

Before the thermally conductive resin layer 310 is formed, that is, before the applied thermally conductive resin is cured, the battery cell stack 120 may be mounted on the bottom portion 300a of the U-shaped frame 300 while moving along a direction perpendicular to the bottom portion 300a of the U-shaped frame 300. Then, the thermally conductive resin layer 310 formed by curing the thermally conductive resin is positioned between the bottom portion 300a of the U-shaped frame 300 and the battery cell stack 120. Referring to FIGS. 2 and 6, the thermally conductive resin layer 310 may serve to transfer heat generated from the battery cell 110 to the bottom of the battery module 100 and fix the battery cell stack 120.

The bottom portion 300a of the U-shaped frame according to the present embodiment includes a first portion 300a1 and a second portion 300a2, wherein the first portion 300a1 is located at an edge based on a longitudinal direction of the battery cell 110, and the second portion 300a2 is located inside the first portion 300a1. The thermally conductive resin layer 310 may be formed on the second portion 300a2. Here, the longitudinal direction of the battery cell 110 may be an X-axis direction of FIG. 5. In this case, a thickness of the first portion 300a1 is identical to that of the second portion 300a2, and a portion extending from the second portion 300a2 to the first portion 300a1 is bent to form a stepped portion 300s in a region corresponding to the first portion 300a1. Here, the stepped portion refers to a structure generated by a height difference from the periphery.

The stepped portion 300s may be formed by processing the bottom portion 300a of the U-shaped frame or by pressing a part of the bottom portion 300a of the U-shaped frame. As will be described later, the battery cell stack 120 is mounted on the bottom portion 300a of the U-shaped frame 300 so that the protruding portion 110p of the battery cell 110 according to the present embodiment protrudes toward the stepped portion 300s.

Referring back to FIGS. 2 and 3, a width of the side surface portion 300b of the U-shaped frame 300 according to the present embodiment may be identical to that of the upper plate 400. In other words, an edge portion along the X-axis direction of the upper plate 400 and an edge portion along the X-axis direction of the side surface portion 300b of the U-shaped frame 300 may be directly met and coupled by a method such as welding.

Figure 7:
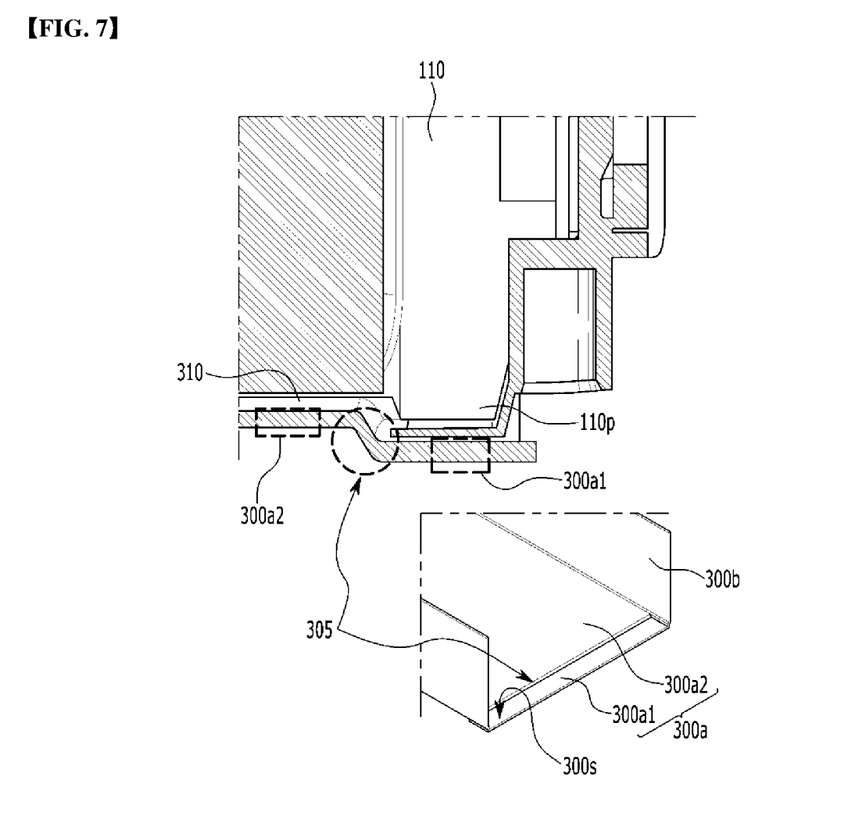
FIG. 7 is a view showing a part of a cross section taken along the XZ plane of FIG. 3.

FIG. 7 is a view showing a part of a cross section taken along the XZ plane of FIG. 3.

Referring to FIGS. 3 and 7, the bottom portion of the U-shaped frame 300 of the battery module 100 according to the present embodiment includes the bottom portion of the U-shaped frame 300 having a first portion 300a1 and a second portion 300a2. The first portion 300a1 and the second portion 300a2 have the same thickness, and the first portion 300a1 and the second portion 300a2 are connected by the bending portion 305. The second portion 300a2 is positioned at a higher level than the first portion 300a1. The protruding portion 110p of the battery cell 110 protrudes toward the stepped portion 300s formed in the first portion 300a1. Accordingly, the protruding portion 110p can be prevented from flowing due to an external impact by being locked in the step between the first portion 300a1 and the second portion 300a2. Further, a gap between the battery cell 110 and the frame member can be reduced through the press molding of the bottom portion 300a of the U-shaped frame, and this gap reduction effect can bring about a synergistic effect with a gap reduction effect which can be obtained through a height direction assembly, thereby maximizing the overall space efficiency. In addition, the protruding portion 110p of the battery cell 110 is positioned in the stepped portion 300s, whereby the space efficiency can be improved by minimizing a separation distance between the battery cell 110 and the bottom portion 300a of the U-shaped frame 300, and further, cost can be reduced by reducing the amount of a thermally conductive resin used to form the thermally conductive resin layer 310. Therefore, cooling efficiency can also be improved.

Figure 8:
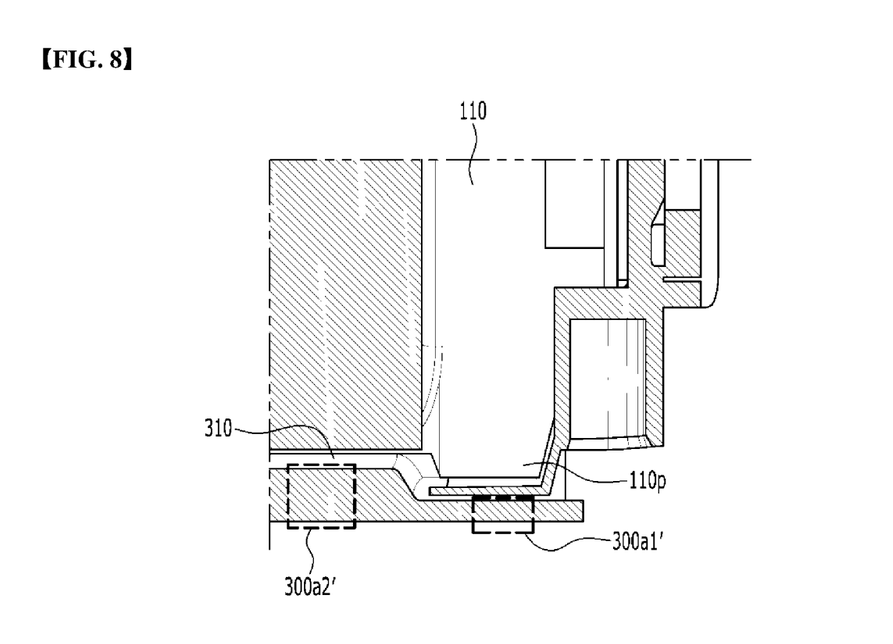
FIG. 8 is a cross-sectional view according to a comparative example to FIG. 7.

FIG. 8 is a cross-sectional view according to a comparative example to FIG. 7.

Referring to the comparative example of FIG. 8, the bottom portion of the U-shaped frame may create a stepped portion through a processing or press compression of the frame bottom portion. In this case, the bottom portion of the U-shaped frame includes a first portion 300a1' and a second portion 300a2' which have different thicknesses. In the case of this comparative example, as in the example of FIG. 7, the amount of the thermally conductive resin may be reduced. However, a thickness of the bottom portion of the U-shaped frame corresponding to the second part 300a2' cannot be reduced. On the other hand, in the battery module according to the embodiment of FIG. 7, since the thickness of the frame bottom portion can be reduced by forming the stepped portion 300s through the press molding, it is possible to design to reduce a height of the case of the battery pack in which the battery module is mounted.

Figure 9:
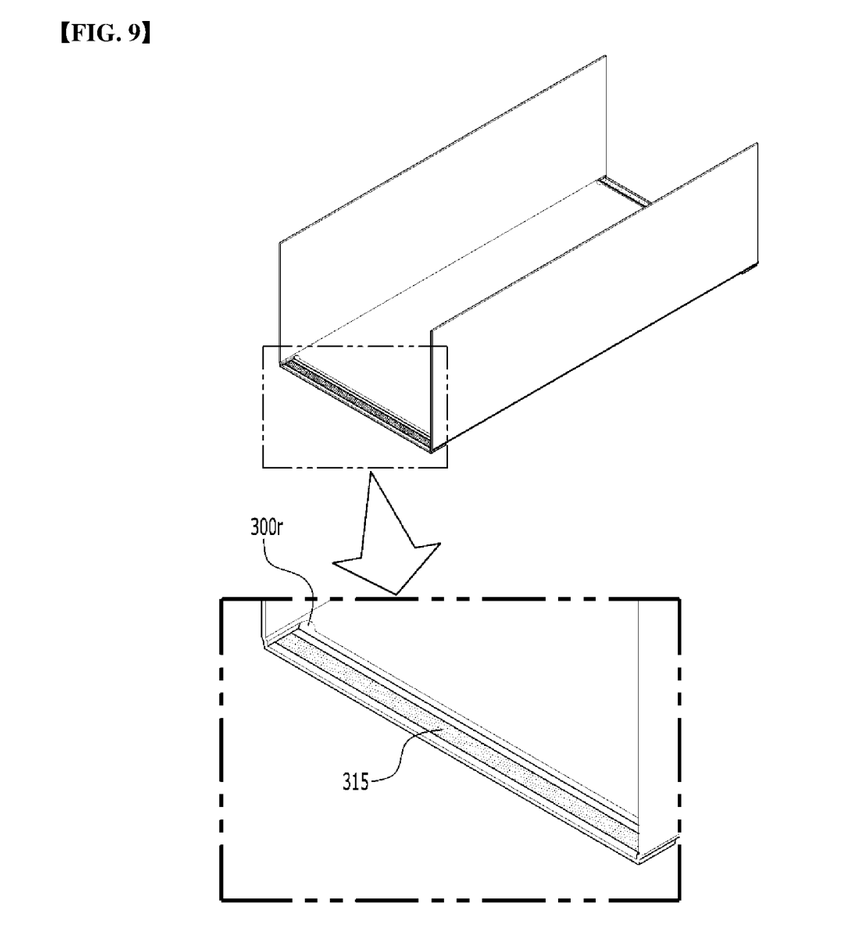
FIG. 9 is a perspective view showing an insulating sheet included in a battery module according to another embodiment of the present disclosure.

FIG. 9 is a perspective view showing an insulating sheet included in a battery module according to another embodiment of the present disclosure.

Referring to FIGS. 6, 7 and 9, the battery module according to the present embodiment may further include an insulating sheet 315 formed in the stepped portion 300s. The insulating sheet 315 may be formed of polyethylene terephthalate (PET), and may be positioned between the protruding portion 110p and the stepped portion 300s of the battery cell 110 as described above. The insulating sheet 315 functions to electrically insulate between the protruding portion 110p of the battery cell 110 and the bottom portion 300a of the U-shaped frame. In this case, the insulating sheet 315 may contact the protruding portion 110p of the battery cell 110. Additionally, an undercut shape 300r may be formed in the stepped portion 300s. The undercut shape 300r may have a round shape. The shape of the insulating sheet 315 may be simplified by the undercut shape 300r formed in the stepped portion 300s. That is, by applying the insulating sheet 315 only to the inside of the press-formed portion, a corner of the insulating sheet 315 adjacent to the undercut shape 300r can be simply formed in a right angle shape.

Meanwhile, one or more of the battery modules according to an embodiment of the present disclosure may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but rather can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
300: U-shaped frame
300a: bottom portion
300b: side surface portion
300r: undercut shape
310: thermally conductive resin layer
400: upper plate

The invention claimed is:

1. A battery module comprising:
a battery cell stack in which a plurality of battery cells are stacked along a stacking direction;
a U-shaped frame accommodating the battery cell stack and having an open upper portion; and
an upper plate covering the battery cell stack at the open upper portion of the U-shaped frame;
wherein a surface of the battery cell stack extending parallel to the stacking direction is mounted on a bottom portion of the U-shaped frame;
wherein the bottom portion of the U-shaped frame includes a stepped portion, and at least one of the plurality of battery cells includes a protruding portion protruding toward the stepped portion,
wherein the stepped portion is at least partially defined by a bent portion of the bottom portion of the U-shaped frame,
wherein the bottom portion of the U-shaped frame comprises a first region and a second region, wherein the first region has a continuous thickness and is located along a first edge extending parallel to the stacking direction, and the second region is spaced away from the first edge, and
wherein the stepped portion is positioned in the first region, and a thickness of the bottom portion of the U-shaped frame is the same in both the first region and the second region.

2. The battery module of claim 1, further comprising a thermally conductive resin layer positioned in the second region between the bottom portion of the U-shaped frame and the battery cell stack.

3. The battery module of claim 2, further comprising an insulating sheet positioned between the stepped portion and the protruding portion of the battery cell.

4. The battery module of claim 3, wherein the insulating sheet is formed of polyethylene terephthalate (PET).

5. The battery module of claim 1, wherein the U-shaped frame defines a first open side and a second open side opposing one another along a lateral direction orthogonal to the stacking direction, wherein an electrode lead of the battery cell stack protrudes therefrom along the lateral direction, and wherein the battery module further comprises an end plate coupled to each of the first and second open sides of the U-shaped frame.

6. The battery module of claim 5, wherein the U-shaped frame includes two side surface portions connected to the bottom portion and facing each other from opposing ends of the bottom portion; and
a distance between the two side surface portions is dimension of the upper plate along the open upper portion of the U-shaped frame.

7. The battery module of claim 1, wherein the protruding portion protrudes along a width dimension of the battery cell orthogonal to the stacking direction.

8. The battery module of claim 1, wherein,
the battery cell comprises four borders, three of the borders being defined by a respective sealing portion and the remaining fourth border being defined by a connecting portion; and
the protruding portion of the battery cell protrudes from the connecting portion.

9. A battery pack comprising the battery module according to claim 1.

10. A battery module comprising:
a battery cell stack in which a plurality of battery cells are stacked along a stacking direction;
a U-shaped frame accommodating the battery cell stack and having an open upper portion; and
an upper plate covering the battery cell stack at the open upper portion of the U-shaped frame;
wherein a surface of the battery cell stack extending parallel to the stacking direction is mounted on a bottom portion of the U-shaped frame,
wherein the bottom portion of the U-shaped frame includes a stepped portion, and at least one of the plurality of battery cells includes a protruding portion protruding toward the stepped portion,
wherein the stepped portion is at least partially defined by a bent portion of the bottom portion of the U-shaped frame, and
wherein the stepped portion defines a second region of the bottom portion extending along a second plane parallel to and offset from a first plane defined by a first region of the bottom portion, the first region being spaced from the second region by the bent portion.

11. The battery module of claim 10, further comprising a thermally conductive resin layer positioned in the second region between the bottom portion of the U-shaped frame and the battery cell stack.

12. The battery module of claim 11, further comprising an insulating sheet positioned between the stepped portion and the protruding portion of the battery cell.

13. The battery module of claim 12, wherein the insulating sheet is formed of polyethylene terephthalate (PET).

14. The battery module of claim 10, wherein the U-shaped frame defines a first open side and a second open side opposing one another along a lateral direction orthogonal to the stacking direction, wherein an electrode lead of the battery cell stack protrudes therefrom along the lateral direction, and wherein the battery module further comprises an end plate coupled to each of the first and second open sides of the U-shaped frame.

15. The battery module of claim 14, wherein the U-shaped frame includes two side surface portions connected to the bottom portion and facing each other from opposing ends of the bottom portion; and
a distance between the two side surface portions is dimension of the upper plate along the open upper portion of the U-shaped frame.

16. The battery module of claim 10, wherein the protruding portion protrudes along a width dimension of the battery cell orthogonal to the stacking direction.

17. The battery module of claim 10, wherein,
the battery cell comprises four borders, three of the borders being defined by a respective sealing portion and the remaining fourth border being defined by a connecting portion; and
the protruding portion of the battery cell protrudes from the connecting portion.

18. A battery pack comprising the battery module according to claim 10.

* * * * *